United States Patent [19]

Kirchberg, Jr. et al.

[11] Patent Number: 4,977,492
[45] Date of Patent: Dec. 11, 1990

[54] SUPPRESSION OF SWITCHING HARMONICS

[75] Inventors: Maurice A. Kirchberg, Jr., Dubuque, Iowa; Alexander Cook, Rockford, Ill.

[73] Assignee: Sundstrand Corporation, Rockford, Ill.

[21] Appl. No.: 514,674

[22] Filed: Apr. 25, 1990

[51] Int. Cl.$^5$ .............................. H02M 1/12
[52] U.S. Cl. ........................ 363/41; 363/37; 363/39
[58] Field of Search ............... 363/37, 39, 40, 41

[56] References Cited

U.S. PATENT DOCUMENTS

| | | | |
|---|---|---|---|
| 4,357,655 | 11/1982 | Beck | 363/42 |
| 4,382,275 | 5/1983 | Glennon | 363/41 |
| 4,519,022 | 5/1985 | Glennon | 363/41 |
| 4,527,226 | 7/1985 | Glennon | 363/41 |
| 4,595,976 | 6/1986 | Parro, II | 363/41 |
| 4,635,177 | 1/1987 | Shekhawat et al. | 363/41 |
| 4,757,434 | 7/1988 | Kawabata et al. | 363/41 |
| 4,763,059 | 8/1988 | Espelage et al. | 318/811 |
| 4,800,478 | 1/1989 | Takahashi | 363/41 |
| 4,935,859 | 6/1990 | Kirchberg et al. | 363/39 |
| 4,935,860 | 6/1990 | Kirchberg et al. | 363/39 |
| 4,937,720 | 6/1990 | Kirchberg | 363/41 |

Primary Examiner—Steven L. Stephan
Assistant Examiner—Bruce Dunn
Attorney, Agent, or Firm—Whitham & Marhoefer

[57] ABSTRACT

An inverter controller adjusts a selected switching pattern to accommodate minor variations and loads in the neighborhood of that pattern. The controller realizes in real-time the equivalent of an iterative solution of predetermined patterns. A number of representative pulse width modulated (PWM) patterns are selected for a range of loads and link ripple. A portion of the fundamental output is inserted onto the d.c. link to control one or more higher harmonics.

4 Claims, 7 Drawing Sheets

SUPPRESSION OF SWITCHING HARMONICS

CROSS-REFERENCE TO RELATED APPLICATIONS

The disclosure of this application is related in subject matter to that of U.S. application Ser. No. 07/521,742 filed May 10, 1990, by Maurice A. Kirchberg, Jr., and Alexander Cook for "Enhanced Real-Time Control of PWM Inverter" and U.S. application Ser. No. 07/514,666 filed Apr. 25, 1990, by Maurice A. Kirchberg, Jr., and Alexander Cook for "Enhanced Real-Time Control of PWM Inverters" (Sundstrand Docket No. BO3279-ATI-USA), both of which are assigned to the assignee of this application. The disclosures of those applications are incorporated herein by reference.

BACKGROUND OF THE INVENTION

Field of the Invention

The present invention generally relates to pulse width modulated (PWM) inverters for converting direct current to alternating current and, more particularly, to an enhanced real-time control of PWM inverters which extends control of harmonics on the inverter output to higher harmonics.

Description of the Prior Art

PWM inverters are employed to convert direct current (d.c.) to alternating current (a.c.). In many applications, it is important to carefully regulate the quality of the a.c. signal generated by the inverter, i.e., minimize distortions of the a.c. waveform. Accordingly, it is customary to define a point of regulation (POR) downstream of the inverter at which the voltage and current of the a.c. signal generated by the inverter is sampled. The sampled voltage and current is used to select appropriate PWM switching patterns to minimize distortion at the POR. Based on the voltage and current sensed at the POR, an inverter controller selects, or creates in real time, an appropriate PWM pattern to minimize the distortion at the POR. As changes in real and reactive component of the power factor of electrical loads coupled to the inverter and changes in the balance in loads in a three-phase system may distort the a.c. waveform; the PWM patterns fed to the inverter change to minimize distortions of the waveform.

A PWM pattern comprises a set of switching events which, when used to control a d.c. voltage in an inverter, produces pulses which, when filtered, approximates a sinusoidal a.c. signal. The pulses created by a PWM pattern are of varying width. Normally, the switches adequately reproduce the desired PWM pattern and thereby create an accurate approximation of a sinusoidal a.c. signal from the d.c. voltage. However, prior art patterns assume a ripple-free (i.e., stiff) d.c. input link. However, under some actual load conditions (particularly when loads are unbalanced), ripple is present on the d.c. link and causes a distortion in the inverter output pulse pattern from that desired and a consequential distortion of the filtered waveform.

The desirability of reducing the harmonic content of an inverter circuit output is recognized in U.S. Pat. No. 4,382,275 to Glennon which relates to a pulse width modulated inverter circuit having an output circuit with reduced harmonic content. The inverter circuit includes a first circuit that provides a filtered fundamental pulse width modulated signal. A second circuit is electrically coupled to the first circuit to receive the signal and sum therewith a controlled signal and the filtered fundamental pulse width modulated signal. The second circuit thereby provides the output signal with reduced harmonic content. The patent to Glennon does not, however, provide for an inverter circuit having a reduced harmonic output signal accomplished by extending the pulse width modulated pattern to include compensation for anticipated harmonic distortion on the d.c. bus.

Another patent to Glennon, U.S. Pat. No. 4,519,022, discloses a ripple reduction circuit for an inverter which converts d.c. power supplied on d.c. buses into a.c. power to drive a load that includes a sensing transformer having a primary winding coupled to one of the buses by a switch so that the ripple on the d.c. bus is sensed. A periodic voltage is impressed across a secondary winding of an output inductor. A primary winding of the output inductor is connected between the output of the inverter and the load. The primary winding of the output inductor receives a first ripple component due to ripple on the d.c. bus and a second ripple component which opposes the first as a result of the periodic wave form in the secondary winding of the output inductor. The two ripple components substantially cancel one another and hence a low distortion power waveform is delivered to the load. Again, this patent to Glennon does not provide for an inverter circuit having a reduced harmonic output signal accomplished by extending the pulse width modulated pattern to include compensation for anticipated harmonic distortion on the d.c. bus.

A more recent Glennon patent, U.S. Pat. No. 4,527,226, discloses a ripple reduction system in which set angles PWM for switching signals are stored. These set angles are intended to reduce ripple by taking into account the normalized d.c. bus voltage and the power factor of the load in selecting the angles.

Other prior inventions have addressed schemes for controlling current and voltage at the POR. Representative of such inventions is U.S. Pat. No. 4,595,976 to Parro, II discloses an inverter control which is an enhancement of the Glennon inverter control. More specifically, the table look up is implemented as a plurality of memories, one for each phase, each of which is subdivided into a plurality of memory blocks which store a number of bytes. Memory address decoding logic addresses a particular memory block in each memory in accordance with a control signal representing the desired waveform to be generated at each phase output. Thus, the Parro, II inverter control accomplishes individual phase regulation of the inverter output.

U.S. Pat. No. 4,635,177 to Shekhawat et al. discloses a further refinement of the basic Glennon inverter control system. More specifically, the Shekhawat et al. control permits on-line generation of PWM patterns for a neutral point clamped PWM inverter. A microprocessor and memory are coupled to the generating circuitry for calculating switching points for the inverter switches during operation of the inverter. Timer modules are coupled to the microprocessor for developing switch points so that the switches are operated to reduce the distortion of the inverter output signal.

Also representative of the prior art are U.S. Pat. Nos. 4,357,655 to Beck, 4,757,434 to Kawabata et al., 4,763,059 to Espelage et al., and 4,800,478 to Takahashi. None of these, however, disclose a PWM selection algorithm which takes into account ripple on the d.c. link.

The wide range of link ripple and load variation encountered in certain applications require more patterns than can be economically stored if refined regulation is required. Current computing techniques do not allow for the iterative solution for patterns in real time.

SUMMARY OF THE INVENTION

It is therefore an object of the present invention to provide an inverter controller which adjusts a selected switching pattern to accommodate minor variations and loads in the neighborhood of that pattern.

It is another object of the invention to provide a controller for a pulse width modulator inverter which realizes in real-time an extension of harmonic control of the inverter output to higher harmonics, and especially the seventeenth harmonic.

In the preferred embodiment of the invention in our contemporaneously filed application Ser. No. 07/514,666, a PWM pattern is shown with seven independent switching angles and seven controlled harmonics; the odd harmonics from the first through the thirteenth. Control of higher harmonics has been by output filter design; however, due to excessive higher harmonic output, particularly the seventeenth harmonic, the output filter required to suppress these harmonics is complex leading to excessive filter weight.

We have discovered that added degrees of freedom may be gained by signal insertion on the d.c. link. In particular, we have found that insertion of the fundamental onto the d.c. link will control higher harmonic output. Other signals can be inserted on the d.c. link to control other higher harmonics. The $7 \times 7$ system is thus extended to control the higher harmonics.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
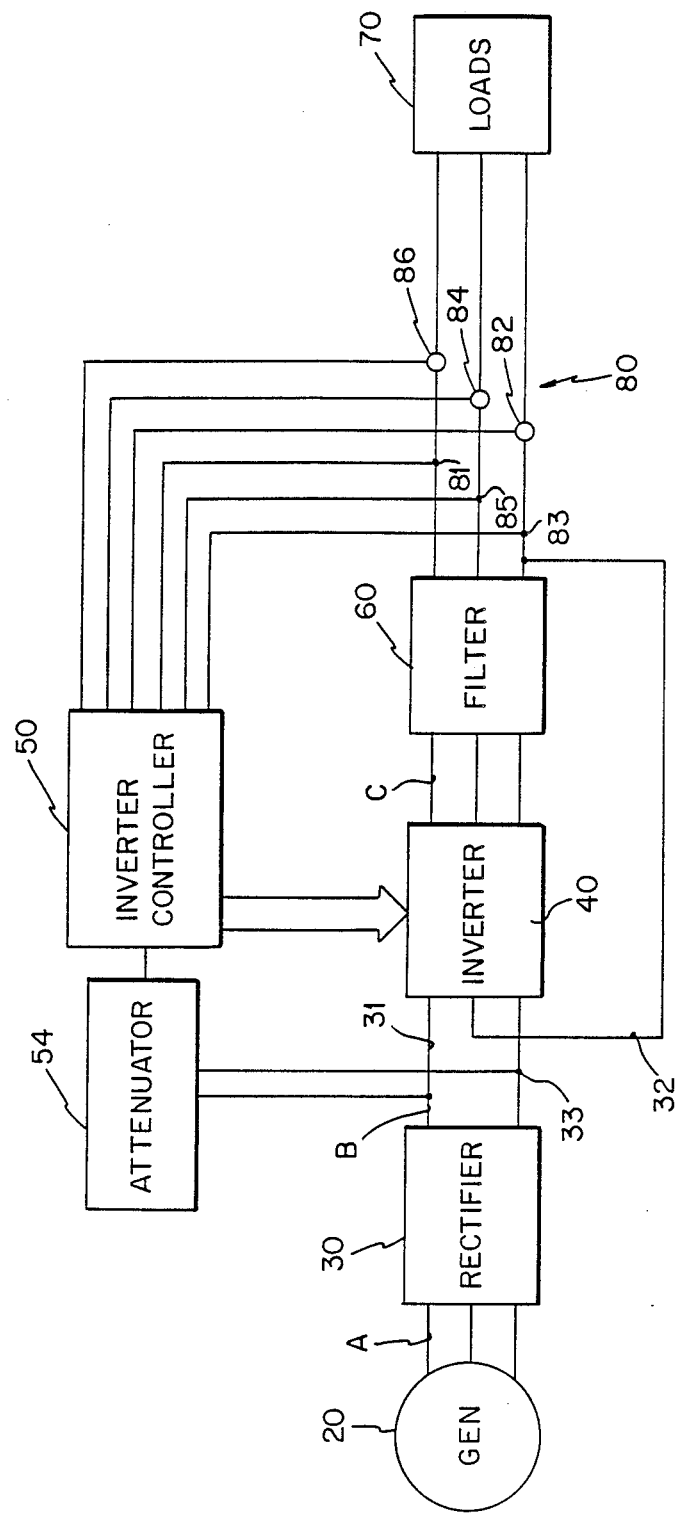
FIG. 1 is a block diagram of a variable speed constant frequency system embodying the invention.

Referring now to the drawings, and more particularly to FIG. 1, there is shown a block diagram of the variable speed constant frequency (VSCF) system embodying the present invention. A generator 20 is mechanically coupled to a variable speed prime mover (not shown) which may be, for example, an aircraft engine. The generator 20 produces a.c. power whose frequency varies as a function of the speed of the prime mover. The resulting a.c. power produced by the generator 20 is therefore termed "wild frequency" a.c. power and is unsuitable for use by most aircraft electrical systems or loads, which is the preferred environment for the operation of the VSCF system.

Accordingly, the VSCF system is designed to convert the wild frequency a.c. power produced by the generator 20 into constant frequency a.c. power, typically at a frequency of 400 Hz, for use by aircraft electrical systems. Wild frequency a.c. power produced by the generator 20 is fed to a rectifier 30 which rectifies the a.c. power into positive and negative d.c. voltages. The d.c. voltages are produced on a d.c. link having a positive d.c. rail 31 and a negative d.c. rail 33. An inverter 40, under control of an inverter controller 50 produces, by pulse width modulation, a PWM waveform from the d.c. voltages which is fed to the filter 60. The filter 60 smooths the PWM waveform produced by the inverter 40 into an approximation of a sinusoidal constant frequency a.c. output which is fed to the aircraft electrical loads 70.

In the preferred embodiment of the invention, the wild a.c. power output by the generator 20 is three phase a.c. power. The constant frequency a.c. power generated by the inverter 40 and smoothed by the filter 60 is likewise three phase. In the preferred embodiment of the invention, the inverter is provided with a neutral point via lead 32 coupled to an output phase of the filter 60 and the rectifier 30.

Figure 2:
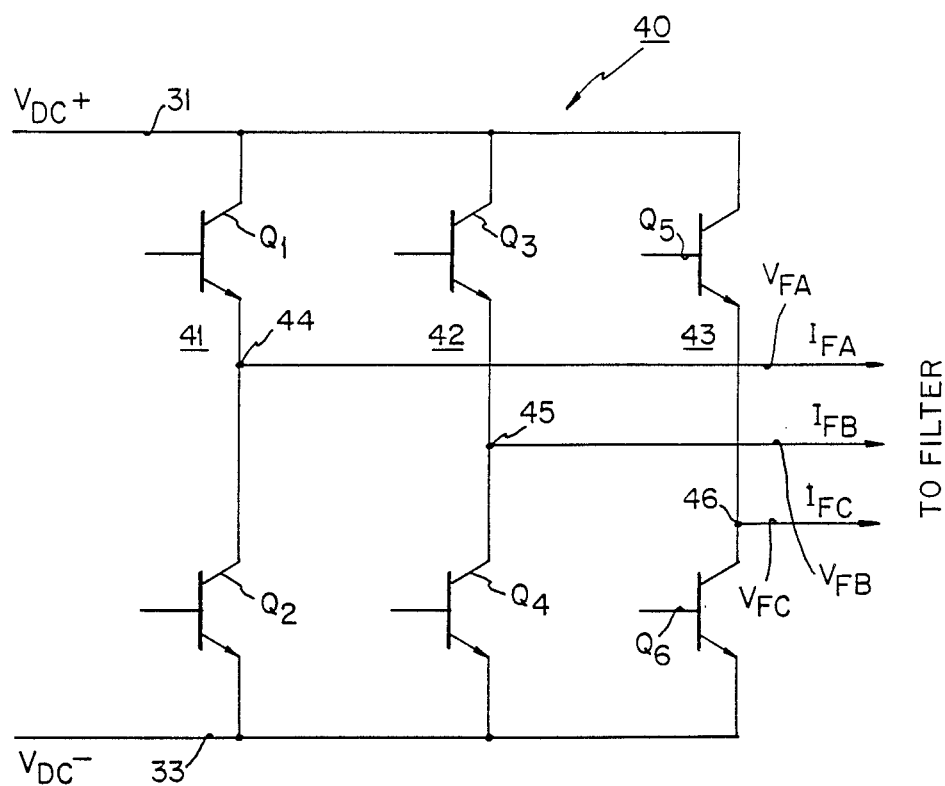
FIG. 2 is a simplified block and schematic diagram of a typical three-phase inverter.

Referring to FIG. 2, the inverter 40 includes three inverter legs 41, 42 and 43, each comprising two controllable power switches, such as switches $Q_1$ and $Q_2$, which are connected in series across the positive and negative d.c. rails 31 and 33. Referring specifically to the inverter leg 41 as an example, the switches $Q_1$ and $Q_2$ are operated in accordance with a PWM waveform pattern developed by the inverter controller 50. Likewise, phase outputs $V_{FB}$, $I_{FB}$ and $V_{FC}$, $I_{FC}$ are produced at the junctions 45 and 46, respectively, by operation of the switches $Q_3$, $Q_4$ and $Q_5$, $Q_6$ in the inverter legs 42 and 43.

Referring back to FIG. 1, the inverter controller 50 has input signals sensed from a point of regulation (POR), indicated generally as 80, which is located downstream of the filter 60. Current is sensed by use of current transformers 82, 84 and 86 which sense respectively each of the three phase currents produced by the filter 60. Likewise, phase to phase voltages are sensed by taps 83, 85 and 87 connected to each of the three phases produced by the filter 60. Each of the signals appearing at the current transformers 82, 84 and 86 and taps 83, 85 and 87 is fed to the inverter controller 50 and is used to select or generate an appropriate PWM switching pattern. Depending on the real or reactive components of the power requirements of the loads 70, the inverter controller 50 selects from memory or creates in real time a PWM pattern which, when supplied to the inverter 40 and filtered by the filter 60, produces an approximate sinusoidal a.c. output waveform which is optimized to minimize the distortion at the POR 80. This selection of a basic switching pattern established in part to compensate for load induced ripple in the output may use suitable prior art techniques such as those disclosed in the aforementioned Glennon U.S. Pat. No. 4,527,226.

The inverter control 50 develops basic operating signals for switches in inverter 40 to produce one of a plurality of PWM outputs in accordance with these sensed parameters. The inverter control 50 includes parameter sensing logic which senses various operating parameters, which include some or all of the following: the currents developed in each of the phase outputs of the inverter, the phase voltages at the POR and the voltage across the d.c. links 31 and 33. The parameter sensing logic generates outputs to an angle set generator which may include selection logic and look up tables in which are stored a plurality of switching patterns. The outputs from the parameter sensing logic are transformed to an address, by known techniques, which causes a switching pattern to be read out of the look up tables. The switching pattern generates phase control waveforms which are utilized to control the inverter switches $Q_1$ to $Q_6$.

Figure 3:
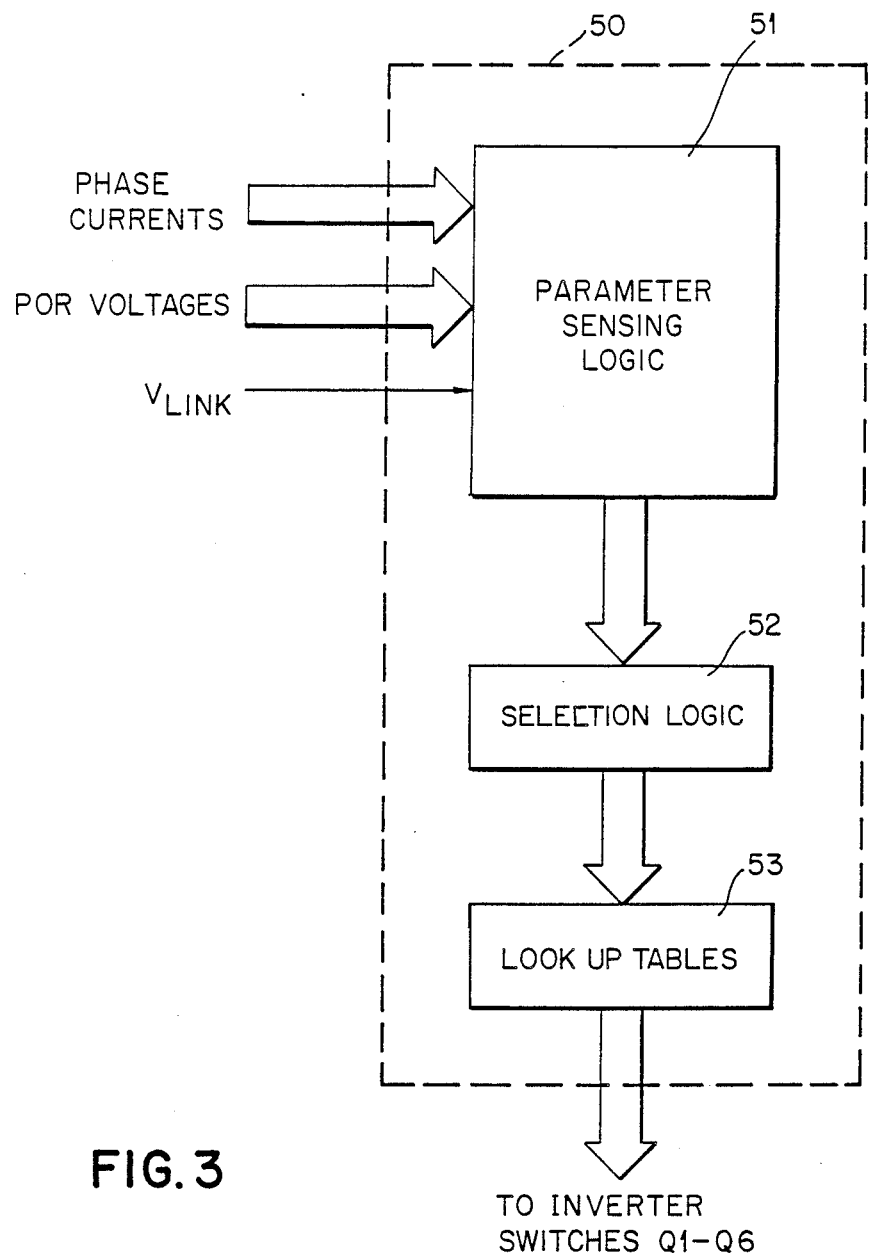
FIG. 3 is a simplified block diagram of the inverter controller shown in FIG. 1.

Referring now to FIG. 3, there is illustrated in block diagram form the inverter control 50 shown in FIG. 1. The inverter control 50 includes parameter sensing logic 51 which senses the various operating parameters of the inverter, including the currents developed in each of the phase outputs of the inverter, the phase voltages at the POR and the voltage across the d.c. lines 31 and 33. The parameter sensing logic 51 generates outputs to the angle set generator which comprises the selection logic 52 and memory look up tables 53. The angle set generator generates the switching pattern that controls the inverter switches $Q_1$ to $Q_6$.

Referring back to FIG. 1 once again, the PWM switching pattern produced by the inverter controller 50 is a collection of switching points, or times, which is used to operate individual transistor switches of the inverter 40. Accordingly, when one knows the current and voltage of the POR 80, one can then determine the nature of the loads 70 (e.g., real and reactive power components and balance of the loads) and can select or generate a suitable pattern to control the inverter 40 to minimize distortion at the POR 80.

Figure 4:
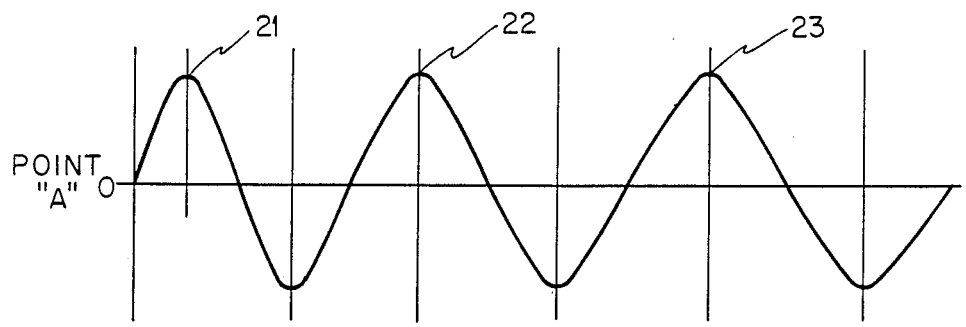
FIG. 4 is a graph representing a variable frequency a.c. signal taken at point "A" in FIG. 1.

The subject invention is an extension of the known technique for inverter control described above. FIG. 4 represents a waveform taken at point "A" of FIG. 1. The waveform is a wild frequency a.c. signal produced by generator 20. The distance from peak 21 to peak 22 is illustrated to show that the distance from peak 21 to peak 22 is less than the distance from peak 22 to peak 23. This is intended to illustrate that the waveform represented in FIG. 4 is a variable frequency. Most aircraft electrical loads are sensitive to changes in frequency and are therefore unable to use the wild frequency produced by the generator as shown in FIG. 4. The waveform represented in FIG. 4 is rectified in the rectifier 30 shown in FIG. 1. Output from the rectifier 30, as previously mentioned is in the form of a d.c. link consisting of a positive d.c. rail 31 and a negative d.c. rail 33 leading to the inverter 40.

Figure 5:
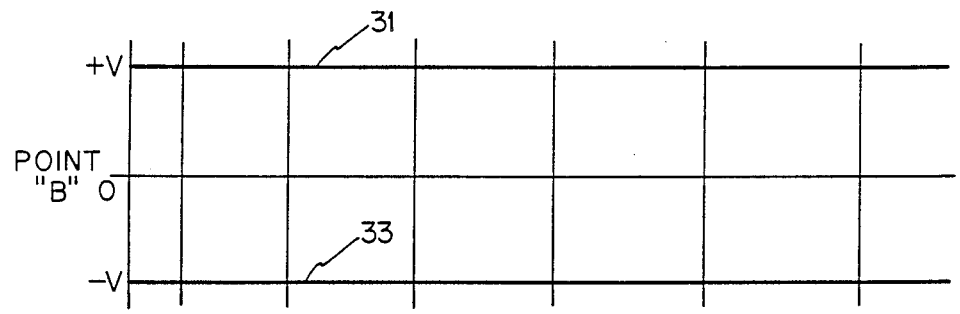
FIG. 5 is a graph representing a d.c. signal taken at point "B" of FIG. 1.

FIG. 5 represents an idealized waveform at point "B" of FIG. 1. Accordingly, FIG. 5 shows a positive rail voltage 31 and a negative rail voltage 33. The assumption in the prior art was that the output from the rectifier 30 was an ideal, ripple-free d.c. voltage; i.e., a "stiff" d.c. link.

Figure 6:
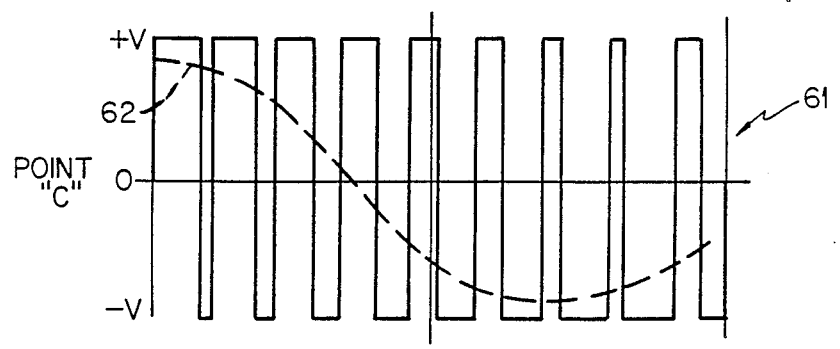
FIG. 6 is a graph representing an idealized controlled inverter output pattern signal taken at point "C" of FIG. 1.

FIG. 6 represents an inverter output signal indicated generally as 61 assuming a "stiff" d.c. link, taken at point "C" in FIG. 1. The signal 61 generated by a switching point set from controller 50 defines positive and negative pulses of varying widths. One typical set of switching points has seven points which are repeated due to symmetry of the waveform. The pulses from the inverter 40 of FIG. 1 are the modulated d.c. link and the pulses to produce an a.c. waveform when filtered. That waveform is approximately sinusoidal as represented by dotted line 62 corresponding to signal 61. During operation, the VSCF system must supply power to loads having different real and reactive power requirements. Accordingly, as previously explained, the inverter controller 50 of FIG. 1 stores, or generates in real time, PWM patterns which are optimized to provide minimum harmonic distortion to the POR 80 for particular operating conditions; i.e., particular real or reactive power loads.

In addition, each of the elements; generator 20, inverter 40, filter 60 and load 70, can cause a modulation of the d.c. input on d.c. links 31 and 33 so that in fact the d.c. link may not be a "stiff" link but may contain a.c. harmonic components.

The invention described in our copending application Ser. No. 07/514,666 is an improvement to the invention disclosed in application Ser. No. 07/521,742 in that it uses the switch pattern modification method of that invention but applies it to all switching events in real time. According to the invention in application Ser. No. 07/514,666, a number of representative PWM patterns are selected for the range of loads and link ripple expected for a given application. These patterns are stored in look up tables 53 shown in FIG. 3. The invention adjusts a selected pattern to accommodate minor variations and loads in the neighborhood of the pattern solution by determining an A×B sensitivity matrix (where A is the number of independent switching events in a pattern and B is the number of controlled harmonics). In the preferred embodiment of the invention there are seven independent switching events and seven controlled harmonics. This sensitivity matrix in combination with an unbalance vector is used to modify the selected switching pattern so as to reduce the inverter output harmonics to an acceptable level. The sensitivity matrix elements represent the responsiveness of the controlled harmonics with respect to change in the individual switching angles. Each element of the sensitivity matrix is determined by calculating the values of:

$$\frac{4d}{n^2 \pi} \times \sin\theta_i$$

for each controlled harmonic and each independent switching angle, where n is the harmonic number (e.g. 1, 3, 5, 7, 9, 11, 13) d is the d.c. link voltage, and $\theta_i$ is the switching angle (e.g., $\theta_1$ through $\theta_7$). In the preferred embodiment, n and i are both 7; i.e., the controlled harmonics are the odd harmonics from the first through the thirteenth and there are seven independent switching angles.

The integrals of the POR voltage times sin(nωt), and the POR voltage times cos(nωt) where n is the controlled harmonic number, comprise the unbalance vector, a B×2 matrix, where again B is the number of controlled harmonics (e.g., 7). Preferably, this unbalance vector is translated back to the inverter output to correct for the response of the output filter 60. The correction factor for each controlled harmonic is equal to the unbalance vector times the amplitude of the filter response minus the phase angle of the filter response for the particular harmonic. These filter responses may be determined empirically for a given filter or may be determined from the filter specification. It will be appreciated that the elements of this $B \times 2$ sensitivity matrix are the Fourier coefficients of the controlled harmonics (e.g., odd harmonics 1 through 13) in the inverter output. We eliminate those elements of the unbalance vector that are not in phase with the fundamental so that a $B \times 1$ unbalance vector remains. While only odd harmonics with zero phase with respect to the fundamental are compensated for with this embodiment, other harmonics, and harmonics with other phase relationships, may be dealt with by treating the appropriate switching angles as independent switching angles and determining harmonic content of the inverter output for these other harmonics and/or phases. This unbalance vector should be zero or as small as it is practical. Dividing the unbalance vector by the sensitivity matrix determines a vernier change to each switching angle which will reduce the harmonic content of the output, ideally to zero. In practice, we establish a minimum threshold and when that threshold is achieved, we accept the selected pattern or its modification, as the case may be. If the harmonic content of the output is too large a new pattern may be selected.

Figure 7:
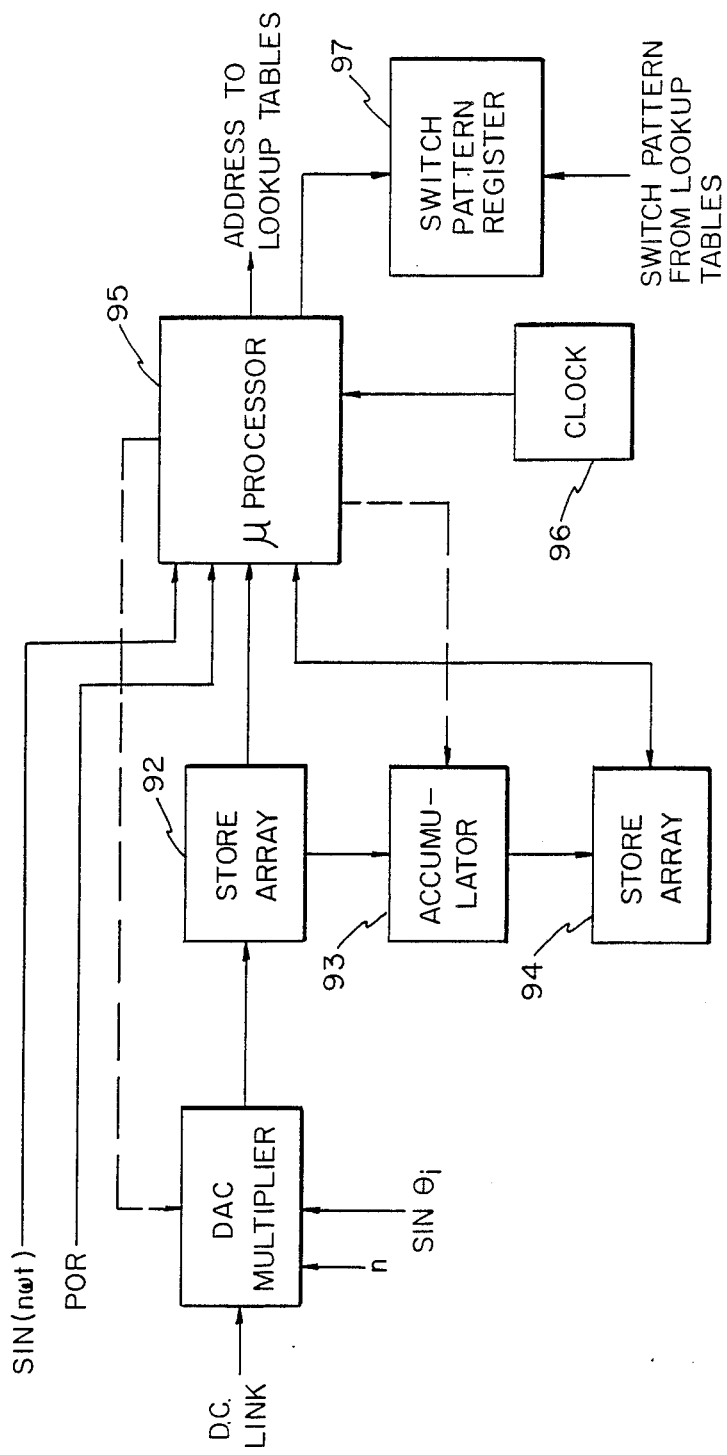
FIG. 7 is a block diagram showing the sensitivity matrix and unbalance vector calculation circuits.

FIG. 7 shows in block diagram form the circuit which accomplishes this vernier adjustment of the switching angles according to the present invention. This circuit comprises a portion of the selection logic 52 shown in FIG. 3.

The elements of the sensitivity matrix $$\frac{4d}{n^2 \pi} \times \sin\theta_i$$

are calculated in multiplier 91 for, in this example n=1, 3, 5, 7, 9, 11, and 13, and for seven
independent switching angles $\theta_1$ through $\theta_7$ for a d.c. link voltage. The elements are stored in a store array 92 which may be a random access memory (RAM). This memory stores the sensitivity matrix. Alternatively, it should be noted that a sensitivity matrix may be determined for each stored switching pattern empirically or by computer modeling.

As previously explained, the unbalance vector, after elimination of elements out of phase with the fundamental, is an $B \times 1$ matrix whose elements are the Fourier coefficients for the controlled harmonics in the inverter output. Preferably, these elements are corrected for the output filter response. The elements of the unbalance vector matrix can be determined by integrating the product of the POR voltage and cos(nωt) and sin(nωt) for each controlled harmonic over one cycle of the fundamental. The elements of this unbalance vector are corrected for filter response and elements out of phase with the fundamental are dropped. The elements of the unbalance vector matrix may be determined by the microprocessor 95 using a Fast Fourier Transform routine and the results stored in storage array 92. Alternatively, the Fourier coefficients may be determined by analog multiplication and integration techniques as disclosed in copending application Ser. No. 07/448,663 filed Dec. 11, 1989, and assigned to the assignee of this invention.

The microprocessor 95 uses the POR voltage and performs the selection logic functions to generate an address to the look up tables 53 in FIG. 3 to read out a selected switch pattern. The selected switch pattern is read into a switch pattern register 97. The pattern in this register is used to control the inverter switches. The microprocessor 95 has access to the pattern in the register 97 so that it may modify the individual switching events.

Figure 8:
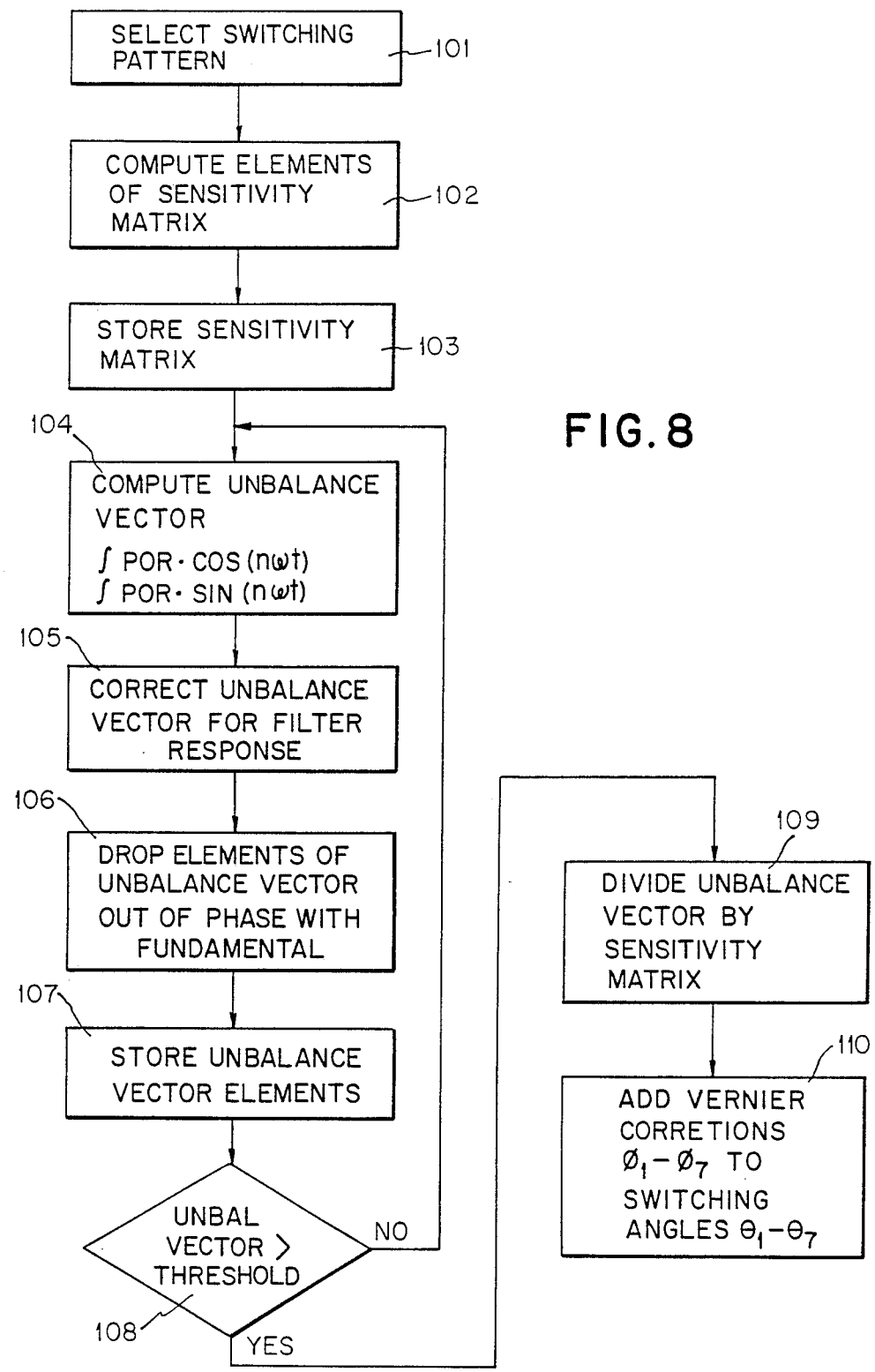
FIG. 8 is a flow chart of the control program for the microprocessor shown in FIG. 7.

The control program for the microprocessor 95 is illustrated in the flow charts of FIG. 8, to which reference is now made. The process begins in function block 101 by selecting a switching pattern in the same manner as is done in the prior art as exemplified by U.S. Pat. No. 4,527,226 to Glennon. The selected pattern is read into register 97. Then, in function block 102 the sensitivity matrix elements are computed, i.e.:

$$\frac{4d}{n^2 \pi} \times \sin\theta_i$$

This is done by the multiplier 91 under the control of the microprocessor 95. The computed sensitivity matrix elements are stored in function block 103. In function block 104, the unbalance vector is computed by integrating the functions POR×cos(nωT) and POR×sin(nωT) over the period of the inverter output fundamental. In block 105 the filter response amplitude and phase factors are applied to translate the Fourier coefficients back to the inverter output. In block 106 the elements out of phase with the fundamental are dropped, leaving a Bx1 unbalance vector matrix. The microprocessor 95 then stores the computed unbalance vector matrix elements in function block 107 and the unbalance vector is tested in decision block 108 to see if any element thereof is greater than a predetermined threshold. If it is not, the selected switching pattern is acceptable, and a return to block 104 is made.

If an unbalance vector element exceeds the threshold, the unbalance vector matrix is divided by the sensitivity matrix, block 109. The microprocessor 95 may conveniently include a commercially available matrix coprocessor to perform various matrix computational functions. The results of this division operation will be for this example of seven controlled harmonics and seven independent switching angles, a seven by one matrix of values (e.g., $\theta_1$ through $\theta_7$) in radians or degrees, which are the respective vernier corrections to the switching angle $\theta_1$ through $\theta_7$. The respective vernier corrections are algebraically added to the respective independent switching angles $\theta_i$, block 110, to form a modified switching pattern. The process then returns to block 102 and a new sensitivity matrix based upon the changed switching angles can be computed.

The process described incorporates the fast selection process of table look up with an iterative vernier adjustment of the individual switching events to achieve a best fit of switching pattern to compensate for load variation and link ripple. This effectively provides more patterns than can be economically stored. The described embodiment, however, is limited. The controlled harmonics are limited to the odd harmonics from the first through the thirteenth. We have observed that the higher harmonics, especially the seventeenth harmonic, contribute a significant amount of distortion to the output waveform unless filtered out. This can be done practically, but the complexity of the output filter 60 results in an increase in weight which, for airborne systems, it is desirable to avoid.

We have discovered that added degrees of freedom may be gained by signal insertion on the d.c. link. In the preferred embodiment, the fundamental obtained at the output of the filter is inserted on the d.c. link to control the seventeenth harmonic in a 7×7 system. Referring back to FIG. 1, this is shown by the line from the controller 50 to attenuator 54 which supplies the d.c. links 31 and 33 with a portion of the fundamental. The attenuator 54 is controlled by the microprocessor 95 shown in FIG. 7. The control program is modified to include a calculation of the product of the POR voltage and $\sin 17\omega t$ integrated over the period of the fundamental. This will be recognized as the Fourier coefficient for the seventeenth harmonic and provides a measurement of the amplitude of that harmonic. This coefficient is compared with a predetermined threshold, and if it exceeds the threshold, then the attenuator 54 is adjusted to increase the amount of the fundamental inserted on the d.c. link.

Figure 9:
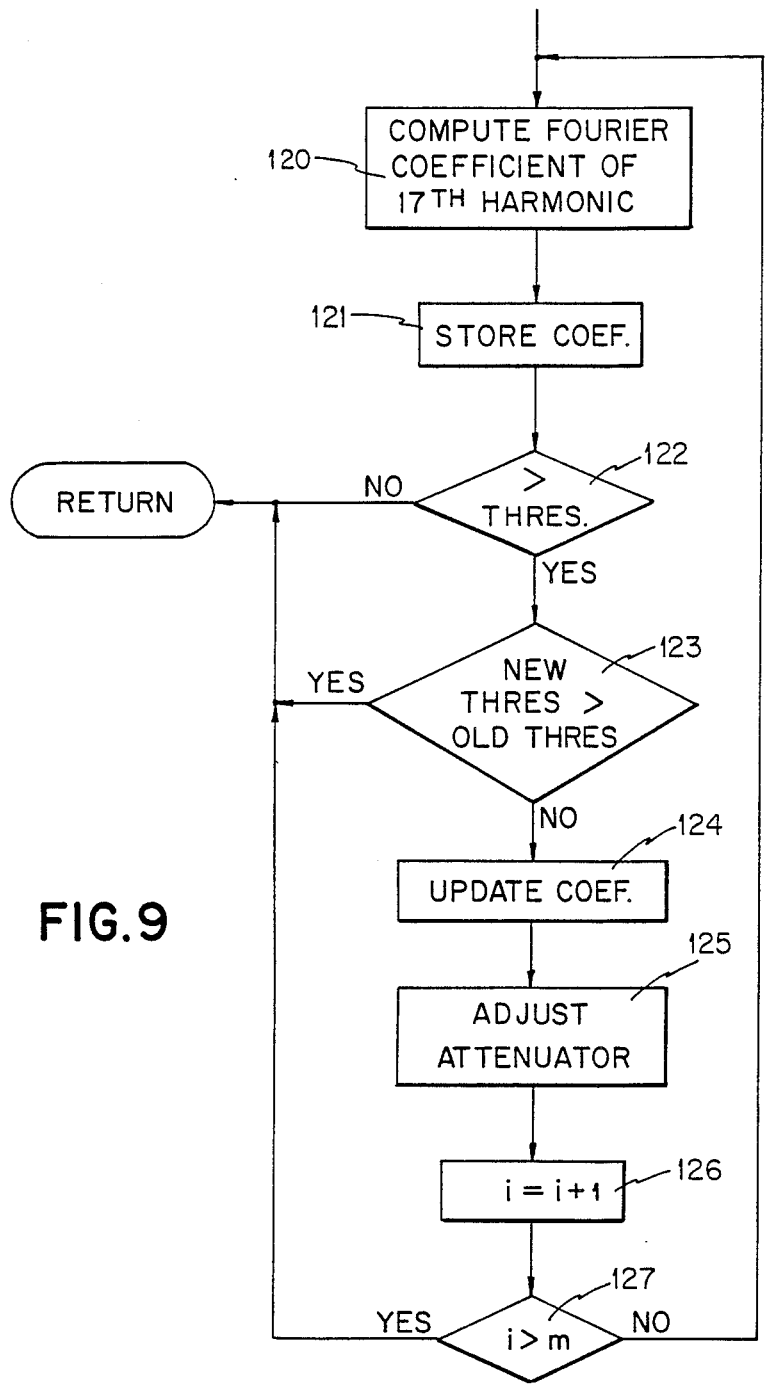
FIG. 9 is a flow chart of that part of the control program which adjusts the amount of fundamental inserted on the d.c. link.

The modification of the control program is illustrated in the flow chart shown in FIG. 9, to which reference is now made. This process may be inserted prior to the return in FIG. 8A. The Fourier coefficient for the seventeenth harmonic is first computed in function block 120. The computed Fourier coefficient is temporarily stored in function block 121. Then, in decision block 122, the computed coefficient is compared with a threshold. If the coefficient is less than the threshold, the process returns to the main program as before. However, if the coefficient exceeds the threshold, a further test is made in decision block 123 to determine if the just computed coefficient is greater than a previously computed coefficient. On the first pass through this loop, the register storing the coefficient is set to all "1s" so that the test is negative. The newly computed coefficient is therefore read into the coefficient register in the update function block 124. Then in operation block 125, the microprocessor 95 adjusts attenuator 54 to increase the amount of the fundamental inserted on the d.c. link. Initially, the attenuator is adjusted so that none of the fundamental is inserted. The amount inserted is a predetermined incremental amount. In function block 126 a counter which keeps track of the number of adjustments of the attenuator is incremented by one. The count in the counter is then tested in decision block 127 to determine if the count has exceeded some predetermined count. If it has, a return is made to the main program; otherwise, the process loops back to function block 120 where a new Fourier coefficient for the seventeenth harmonic is computed.

The process described is not limited to controlling just the seventeenth harmonic in a 7×7 system. Other signals may be inserted on the d.c. link to control even higher harmonics, as may be required in a particular application.

While the invention has been described in terms of a single preferred embodiment, those skilled in the art will recognize that the invention can be practiced with modification within the spirit and scope of the appended claims.

Having thus described out invention, what we claim as new and desire to secure by Letters Patent is as follows:

1. A controller for an inverter of the type including a source of d.c. voltage, inverter switches controlled by the controller to chop said d.c. voltage to generate a pulse width modulated pattern, and a filter for smoothing the pulse width modulated pattern to produce a generally sinusoidal output, said controller selecting from a plurality of stored switching angle sets an initial switching angle set for controlling said inverter switches based on sensed parameters at an output of said inverter, comprising:
   means for adjusting individual ones of said switching angles to control harmonics through the Nth harmonic in the inverter output;
   means for inserting a signal on said source of d.c. voltage to control at least one harmonic higher than said Nth harmonic.

2. The controller recited in claim 1 wherein said means for inserting inserts a portion of a fundamental signal from said sinusoidal output.

3. A controller for an inverter of the type including a source of d.c. voltage, inverter switches controlled by the controller to chop said d.c. voltage to generate a pulse width modulated pattern to produce a generally sinusoidal output, said controller selecting from a plurality of stored switching angle sets an initial switching angle set for controlling said inverter switches based on sensed parameters at an output of said inverter, comprising:
   means for computing an NxN' sensitivity matrix, where N is the number of controlled harmonics, and N' is the number of independent switching angles in a switching angle set, the elements of said matrix representing sensitive to change of controlled harmonics with respect to individual switching angles
   means for computing an unbalance vector, said unbalance vector being a function of the harmonic coefficients of the output of the inverter for the controlled harmonics;
   means for determining whether said unbalance vector is less than a predetermined threshold;
   means responsive to said sensitivity matrix and said unbalance vector for adjusting individual ones of said switching angles when said unbalance vector is greater than said predetermined threshold; and
   means for inserting a signal on said source of d.c. voltage to control at least one harmonic higher than said Nth harmonic.

4. A method for controlling an inverter of the type including a source of d.c. voltage, inverter switches controlled by a controller to chop said d.c. voltage to generate a pulse width modulated pattern, and a filter for smoothing the pulse width modulated pattern to produce a generally sinusoidal output, said controller selecting from a plurality of stored switching angle sets an initial switching angle set for controlling said inverter switches based on sensed parameters at an output of said inverter, said method comprising the controller performed steps of:
   adjusting individual ones of said switching angles to control harmonics through the Nth harmonic in the inverter output; and
   inserting a signal on said source of d.c. voltage to control at least one harmonic higher than said Nth harmonic.

* * * * *